United States Patent [19]
Wood

[11] Patent Number: 6,029,405
[45] Date of Patent: Feb. 29, 2000

[54] APPARATUS AND METHOD FOR INHIBITING WATER FROM ENTERING A STRUCTURE

[76] Inventor: Barbara A. Wood, 4309 N. 27th St., Phoenix, Ariz. 85016

[21] Appl. No.: 09/065,216

[22] Filed: Apr. 23, 1998

[51] Int. Cl.[7] ................................................... E04B 1/62
[52] U.S. Cl. ...................... 52/2.23; 52/169.14; 52/741.4
[58] Field of Search .................................. 52/3, DIG. 12, 52/101, 169.11, 169.14, 2.21, 2.23, 741.1, 741.3, 741.4, 5

[56] References Cited

U.S. PATENT DOCUMENTS

| | | | |
|---|---|---|---|
| 3,227,169 | 1/1966 | Fischer | ..................................... 52/2.23 |
| 4,279,540 | 7/1981 | Suga et al. | . |
| 4,425,744 | 1/1984 | Villareal | ................................. 52/169.14 |
| 4,488,386 | 12/1984 | Thompson | ............................ 52/169.14 |
| 4,693,042 | 9/1987 | Villarreal | ............................... 52/169.14 |
| 5,125,767 | 6/1992 | Dooleage | . |
| 5,217,557 | 6/1993 | Hogan | . |
| 5,285,603 | 2/1994 | Richard et al. | ..................... 52/DIG. 12 |
| 5,645,373 | 7/1997 | Jenkins | . |

*Primary Examiner*—Michael Safavi
*Attorney, Agent, or Firm*—Parsons & Goltry; Robert A. Parsons; Michael W. Goltry

[57] ABSTRACT

A barrier for inhibiting water from entering a structure. The barrier being coupled with the structure and movable between a collapsed orientation and an extended orientation overlying and encircling the structure for inhibiting water from entering the structure. A mechanism is included for moving the barrier between the collapsed orientation and the extended orientation.

12 Claims, 5 Drawing Sheets

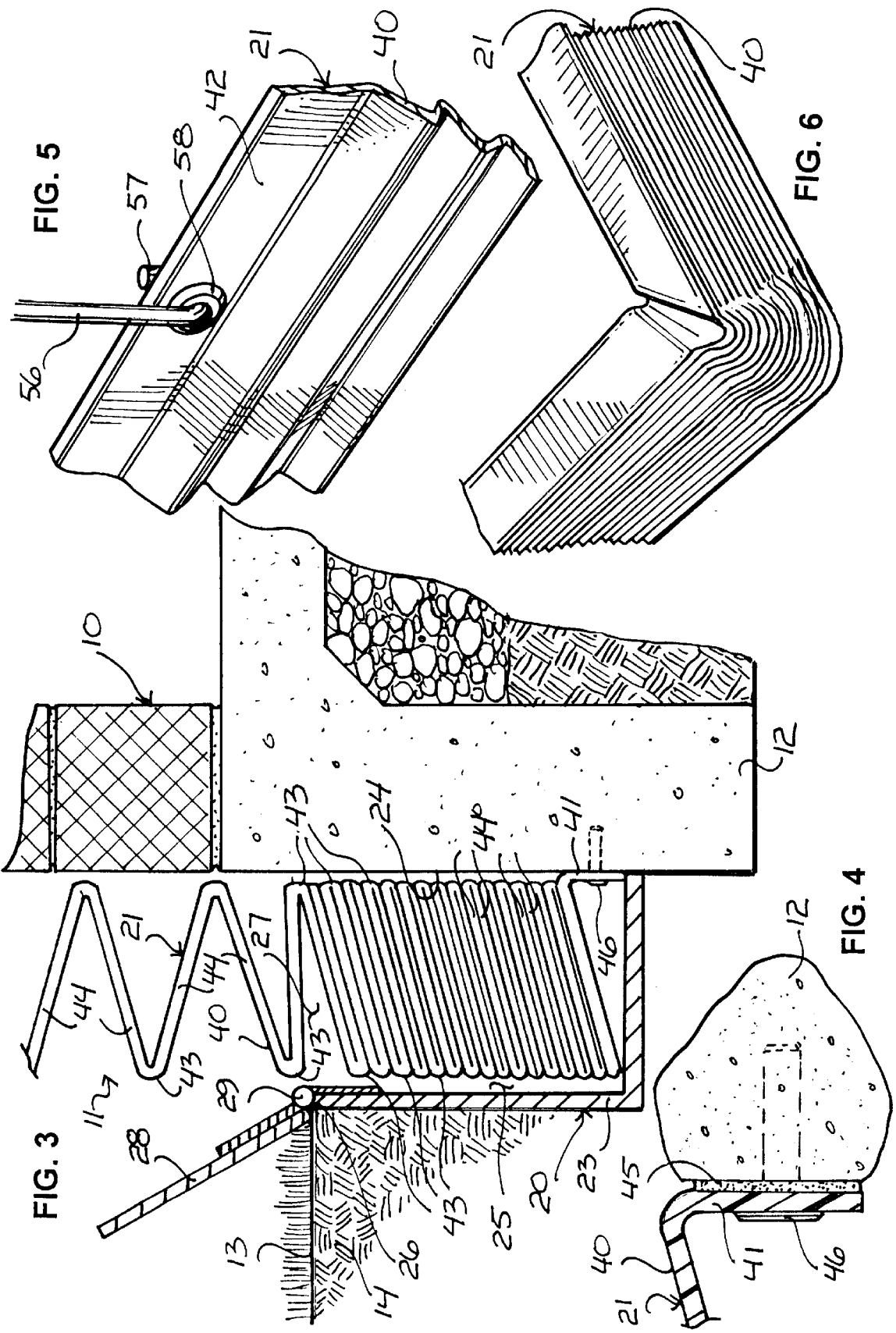

APPARATUS AND METHOD FOR INHIBITING WATER FROM ENTERING A STRUCTURE

FIELD OF THE INVENTION

This invention relates generally to the field of flood control apparatus and, more particularly, to apparatus and methods for inhibiting water from entering structures.

BACKGROUND OF THE INVENTION

There are many places throughout the world subject to seasonal flooding. To prevent homes and business from flooding and becoming ravaged and damaged from exposure to flood waters, various flood control systems and methods have been devised such as, for instance, portable-damming apparatus. Although exemplary, known flood control systems and methods are expensive and largely ineffective for protecting homes and business from flood damage in extreme flood conditions.

Accordingly, it would be highly desirable to provide new and improved flood control apparatus and methods of inhibiting water from entering and damaging structures.

It is a purpose of the present invention to provide flood control apparatus that is easy to install.

It is another purpose of the present invention to provide flood control apparatus that is easy to use.

It is still another purpose of the present invention to provide flood control apparatus that is inexpensive.

It is yet still another purpose of the present invention to provide flood control apparatus that is highly effective for inhibiting water from entering a structure in severe flooding conditions.

It is a further purpose of the present invention to provide flood control apparatus that is convenient and easy to deploy.

It is still a further purpose of the present invention to provide a new and improved method of inhibiting flood water from entering and damaging a structure.

It is yet still a further purpose of the present invention to provide a new and improved method that is easy to implement into conventional construction methods and preexisting structures.

SUMMARY OF THE INVENTION

The above problems and others are at least partially solved and the above purposes and others are realized in apparatus and methods for inhibiting water from entering a structure. In a particular embodiment, apparatus of the present invention is generally comprised of a barrier coupled with a structure and movable between a collapsed orientation and an extended orientation overlying the structure for inhibiting water from entering the structure, and means for moving the barrier between the collapsed orientation and the extended orientation. The barrier is generally comprised of a substantially water-impermeable sheet-like element. To move the barrier between the collapsed and extended orientation, the present invention may further include cordage coupled with the barrier and a motive mechanism for moving the cord between first and second orientations for moving the barrier between the collapsed and extended orientations. In another embodiment, the barrier may be equipped with a plurality of receptacles that may be inflated for moving the barrier between the collapsed and extended orientations.

Consistent with the foregoing, associated methods of inhibiting water from entering a structure may also be provided.

BRIEF DESCRIPTION OF THE DRAWINGS

The foregoing and further and more specific objects and advantages of the instant invention will become readily apparent to those skilled in the art from the following detailed description thereof taken in conjunction with the drawings in which:

FIG. 3 illustrates a vertical sectional view of the barrier of FIG. 1 shown as it would appear coupled to a foundation of the structure of FIG. 1 and contained in a housing;

FIG. 4 illustrates an enlarged sectional view of an extremity of the barrier of FIG. 3 shown as it would appear coupled with the foundation;

FIG. 5 illustrates a fragmented perspective view of the barrier of FIG. 1 showing a hook element for engaging cordage with the barrier;

FIG. 6 illustrates a fragmented perspective view of the barrier of FIG. 1 shown as it would appear in a collapsed orientation;

DETAILED DESCRIPTION OF A PREFERRED EMBODIMENT

The present invention provides, among other things, apparatus and methods for protecting structures from floodwaters and, more particular, for inhibiting water from entering a structure. The present invention incorporates storing a substantially water-impermeable barrier adjacent a structure and deploying the barrier to surround or otherwise bound the structure for inhibiting water from entering the structure.

Figure 1:
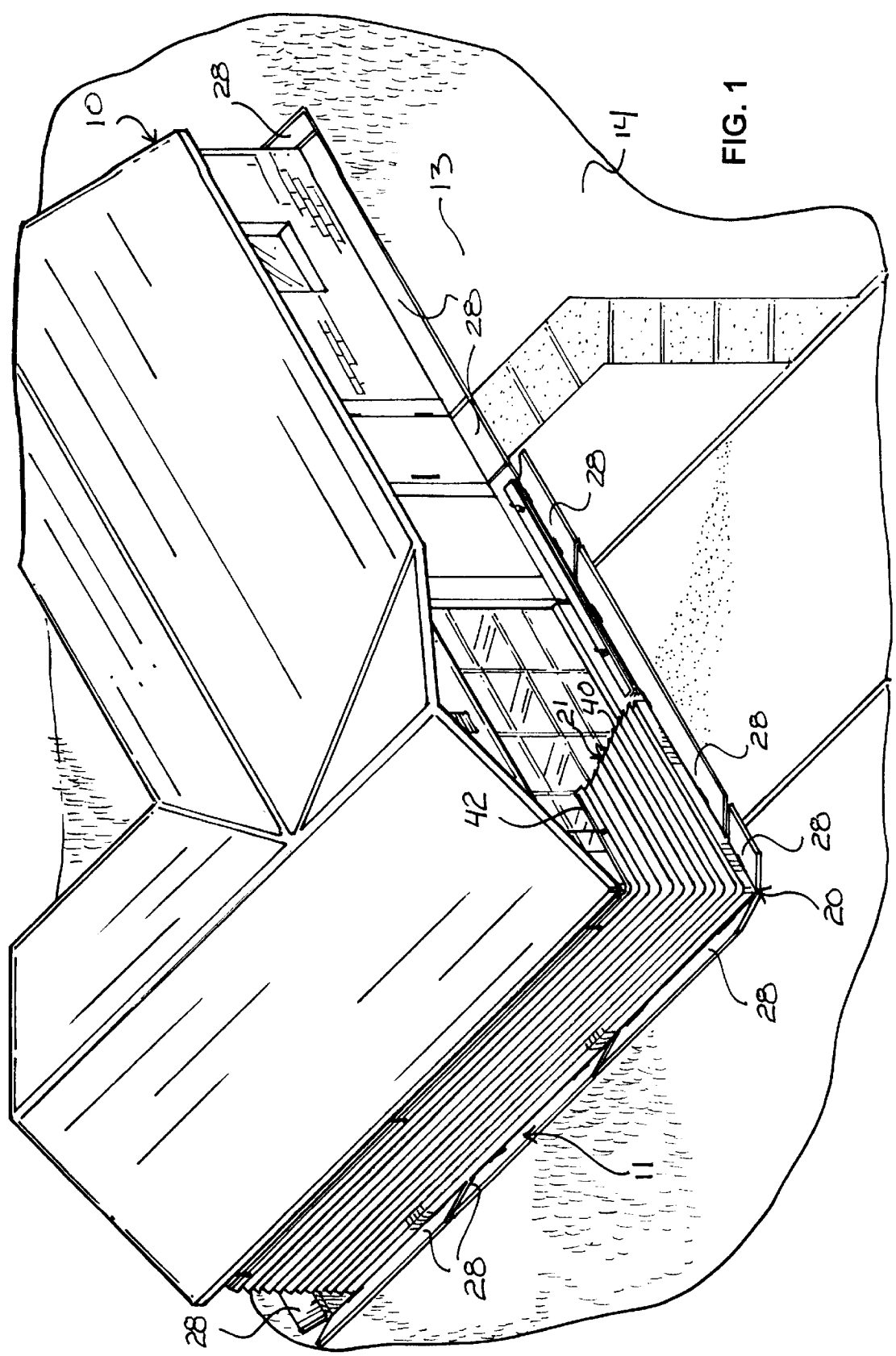
FIG. 1 illustrates a fragmented perspective view of a structure and a barrier for inhibiting water from entering the structure, in accordance with the present invention.

Turning now to FIG. 1, illustrated is a fragmented perspective view of a structure 10 and apparatus 11 encircling or otherwise surrounding structure 10 for inhibiting water from entering structure 10, in accordance with the present invention. With continuing reference to FIG. 1 and additional reference to FIG. 3 illustrating, among other things, a sectional view of a portion of structure 10, structure 10 is shown as a conventional dwelling structure extending upwardly from a foundation 12 beneath a surface 13 of the ground 14 and terminating above surface 13 of ground 14, foundation 12 defining a footprint of structure 10. Consistent with the ensuing discussion, not only does apparatus 11 encircle structure 10, it is also constructed to conform substantially to the footprint of structure 10 as generally defined by foundation 12.

Figure 2:
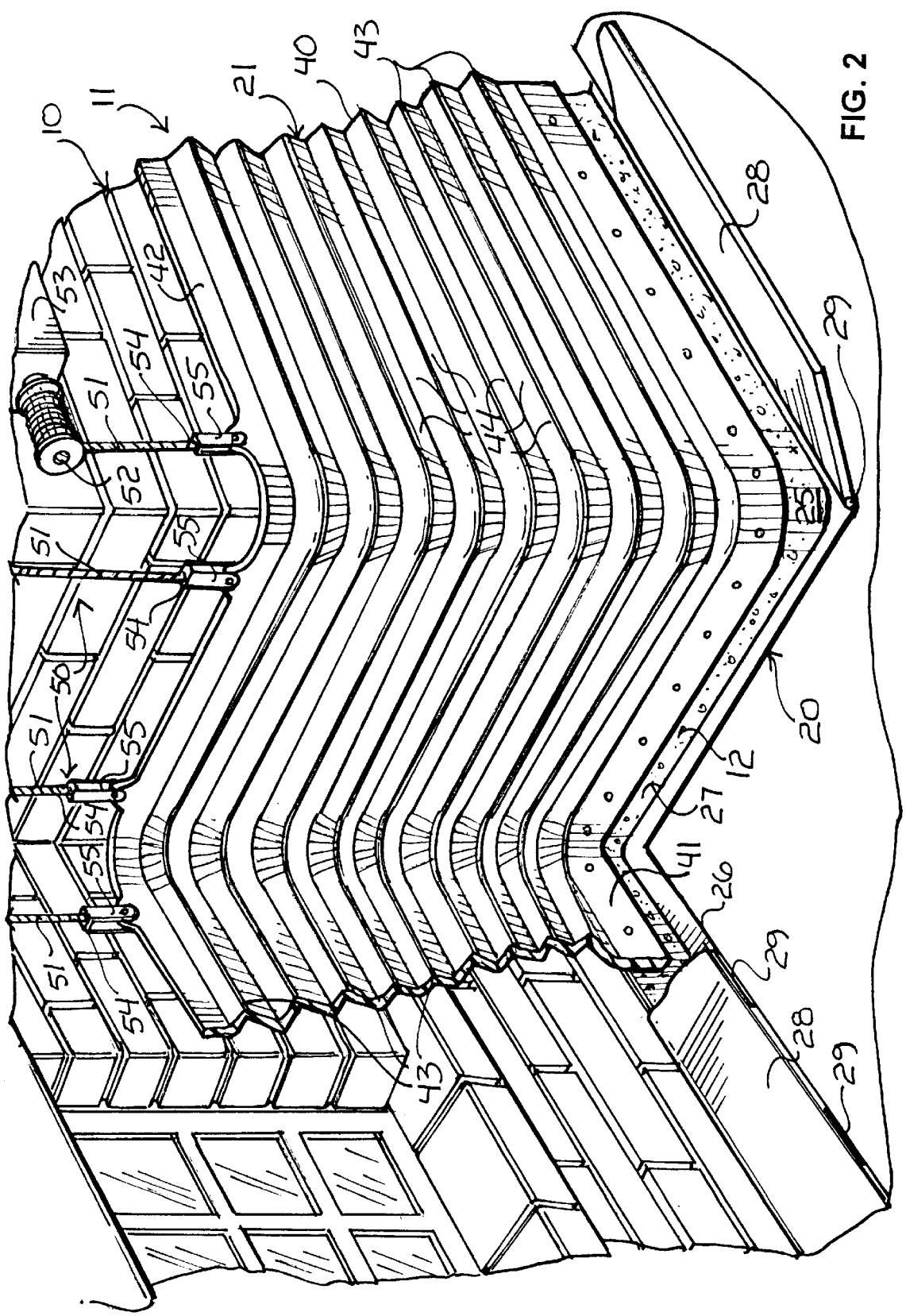
FIG. 2 illustrates an enlarged fragmented perspective view of the structure and the barrier of FIG. 1, the barrier shown as it would appear deployed by cordage for inhibiting water from entering the structure.

With continuing reference to FIG. 3, apparatus 11 generally comprises a housing 20 encircling structure 10 somewhat outboard of foundation 12 and a barrier 21. Barrier 21 is coupled with and encircles structure 10 and is movable between a first or collapsed orientation contained in housing 20 and a second or an extended orientation extending outwardly from housing 20 overlying structure 10 as shown substantially in FIGS. 1 and 2 for inhibiting water from entering structure 10. Preferably formed of a substantially rigid material such as concrete, a selected metal or other substantially rigid material, housing 20 is formed substantially beneath surface 13 of ground 14 adjacent foundation 12 and is generally comprised of a floor 22 and a sidewall 23 extending upwardly from floor 22 in spaced-apart and substantially parallel relation relative an outer surface 24 of foundation 12. Sidewall 23, floor 22 and outer surface 24 of foundation cooperate to bound a channel 25 encircling structure 10. Furthermore, sidewall 23 terminates upwardly from floor 22 with an upper end 26 that cooperates with portions of outer surface 24 of foundation 12 bounding an opening 27 leading into chamber 25. As shown in FIGS. 1–3, housing 20 further includes a predetermined and selected plurality of lids 28 each coupled with upper end 26 (not shown in FIG. 1) for movement in pivotal directions, such as by one or more hinges 29 as shown in FIGS. 2 and 3, between a closed position for enclosing chamber 25 and an open position as shown in FIG. 3 for accessing chamber 25 through opening 27.

In the specific example shown in FIG. 2, barrier 20 includes an accordion-pleated folded sheet-like strip or element 40 having a first extremity 41, a second extremity 42 (shown only in FIGS. 1 and 2) and a plurality of fold lines 43 extending substantially from first extremity 41 to second extremity 42 in spaced-apart and substantially parallel relation dividing element 40 into joined adjacent sections or sheets 44. Preferably constructed of a selected plastic material, polyethylene or other substantially flexible and water-impermeable material, element 40 preferably extends continuously about substantially the entire perimeter, and somewhat outboard of, structure 10 to encircle structure 10.

Regarding FIG. 3, first extremity 41 of element 40 is coupled with outer surface 24 of foundation via a substantially continuous seal encircling structure 10. To seal first extremity 41 with foundation 12 in this regard, and with attention directed to FIG. 4, provided is a sealant 45 sealing engaging first extremity 41 with outer surface 24 of foundation 12 and a fastener 46, such as a pin or rivet, extending into and through first extremity 41, sealant 45 and terminating in foundation 12. Although only one fastener 46 is shown, it will be readily understood that a selected plurality of fasteners 46 may be provided at spaced apart intervals along substantially the entire extent of first extremity 41 encircling foundation 12 as desired for fastening first extremity 41 with foundation 12 along substantially the entire extent of first extremity 41. Furthermore, sealant 45 may be provided as any suitable and conventional water-resistant adhesive sealant.

Each fold line 43 defines a living hinge to enable the folding of each sheet 44 into an overlying position relative an adjacent sheet 44 in a collapsed orientation of element 40 as shown in FIG. 6 for containment within chamber 25 of housing 20 as shown substantially in FIG. 3 and, in the open position of each lid 28, the movement or extension of element 40 outwardly from chamber 25 in an extended orientation as shown substantially in FIGS. 1 and 2 to encircle or bound at least the exposed sidewalls of structure 10 from first extremity 41 to second extremity 42. In the extended orientation of element 40, second extremity 42 may be positioned to terminate and reside at a predetermined location along the exposed sidewalls of structure 10 spaced from surface 13 of ground as desired.

Regarding FIG. 2, to move element 40 from the collapsed or stored orientation contained within chamber 25 of housing 20 and the extended orientation to encircle structure 10 and inhibit water from entering structure 10 through, for instance, doorway openings, window openings and vents formed through the exposed sidewalls of structure 10, provided is cordage 50 coupled or otherwise engagable with or otherwise proximate second extremity 42 and movable between first and second orientations for moving element 40 between the collapsed and extended orientations. In this specific example, cordage 50 is generally comprised of a plurality of cords 51 each carried by a drum 52 (only one shown) mounted for rotation with a motor 53 coupled with structure 10 at an elevated location relative surface 13 of ground 14 in substantial opposition to housing 20, each cord 51 depending therefrom and terminating with a free end 54 engagable or otherwise coupled with or proximate second extremity 42. In FIG. 2, each free end is shown permanently fixed with or otherwise proximate second extremity 42 via connectors 55. However, and with momentary attention directed to FIG. 5, each free end may be fixed to a hook element 56 having a hooked end 57 hookingly and detachably engagable with one of plurality of eyelets 58 (only one shown) formed through second extremity 42 if so desired.

To thus move element 40 from the collapsed orientation to the extended orientation, and with lids 28 open and free end 54 of each cord 51 coupled with or otherwise proximate second extremity 42, each motor 53 may be actuated for rotating a respective drum in a predetermined direction for wrapping cords 51 about drums 52 to move cords 51 from the first or extended orientation corresponding to the collapsed orientation of element 40 to a second or retracted orientation as shown in FIG. 2 pulling element 40 into the extended orientation. To move element 40 from the extended orientation to the collapsed orientation, the foregoing process need only be reversed. Furthermore, due to the accordion-pleated nature of element 40, element 40 will fold neatly in accordion-style into chamber 25 when moved from the extended orientation to the collapsed orientation.

Each motor 53 may be provided as a conventional electric- or battery operated- motor. Alternatively, a user may engage and pull cordage 50 manually for moving element 40 between the collapsed and extended orientations if so desired. In this regard, and although not shown, a conventional cordage pulley system may be employed and installed with structure 10 for facilitating ease of manual manipulation of element 40.

Figure 7:
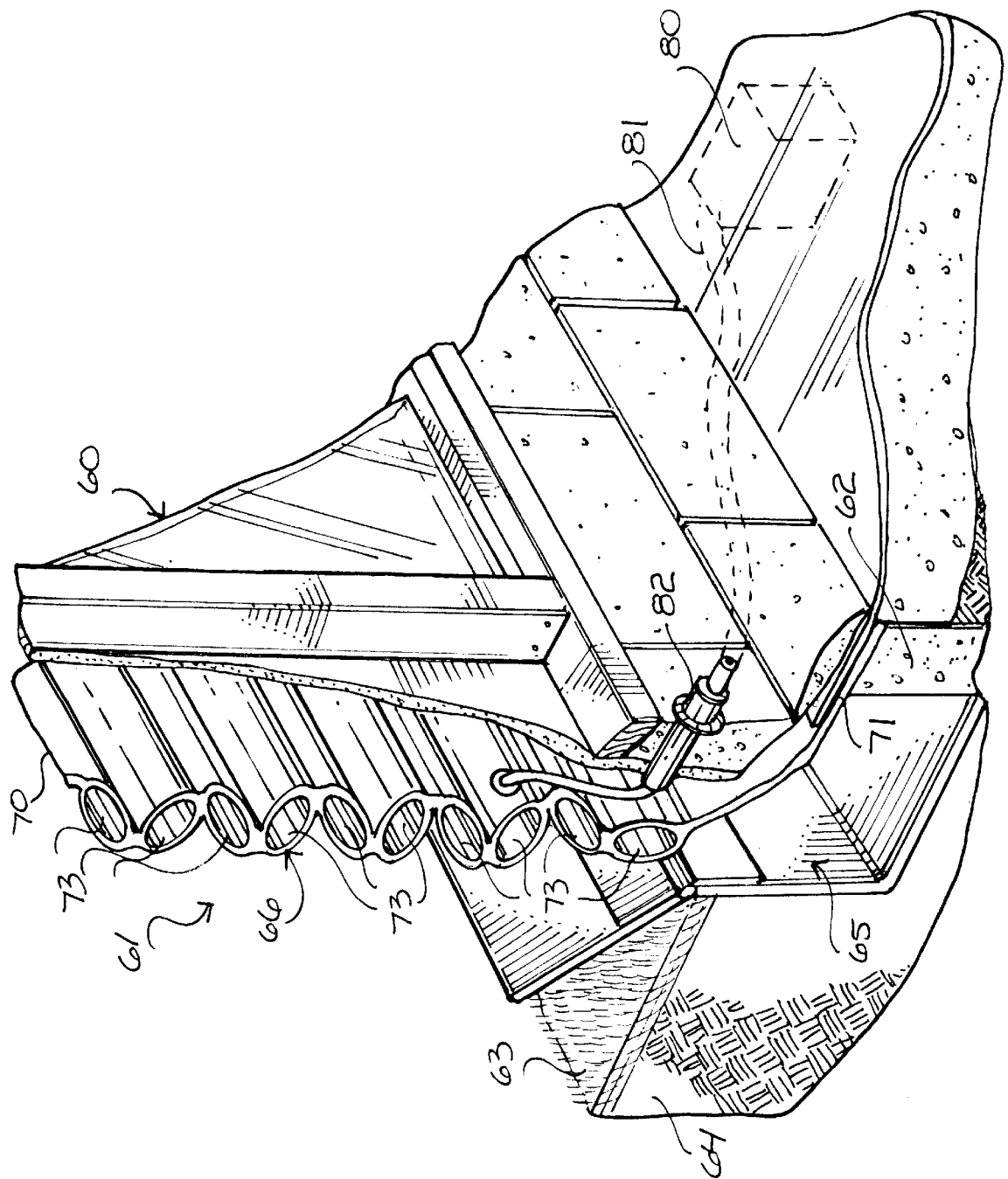
FIG. 7 illustrates a fragmented perspective view of apparatus for inhibiting water from entering a structure, in accordance with an alternate embodiment of the present invention.

Turning now to FIG. 7, illustrated is a fragmented perspective view of a structure 60 of substantially like construction to structure 10, and apparatus 61 encircling or otherwise surrounding structure 60 (not specifically shown) for inhibiting water from entering structure 60, in accordance with an alternate embodiment of the present invention. Like structure 10, structure 60 is shown as a conventional dwelling structure extending upwardly from a foundation 62 beneath a surface 63 of the ground 64 and terminating above surface 63, foundation 62 defining a footprint (not shown) of structure 60. Consistent with the preceding discussion of apparatus 11, not only does apparatus 61 encircle structure 60, it is also constructed to conform substantially to the footprint of structure as generally defined by foundation 62.

Like apparatus 11, apparatus 61 generally comprises a housing 65 of identical construction to housing 20 previously discussed, further details of which will not be again discussed, and a barrier 66. Barrier 66 is coupled with and encircles structure 60 and is movable between a collapsed orientation contained in housing 65 and an extended orientation extending outwardly from housing 65 overlying at least the exposed sidewalls of structure 60 for inhibiting water from entering structure 60.

Figure 8:
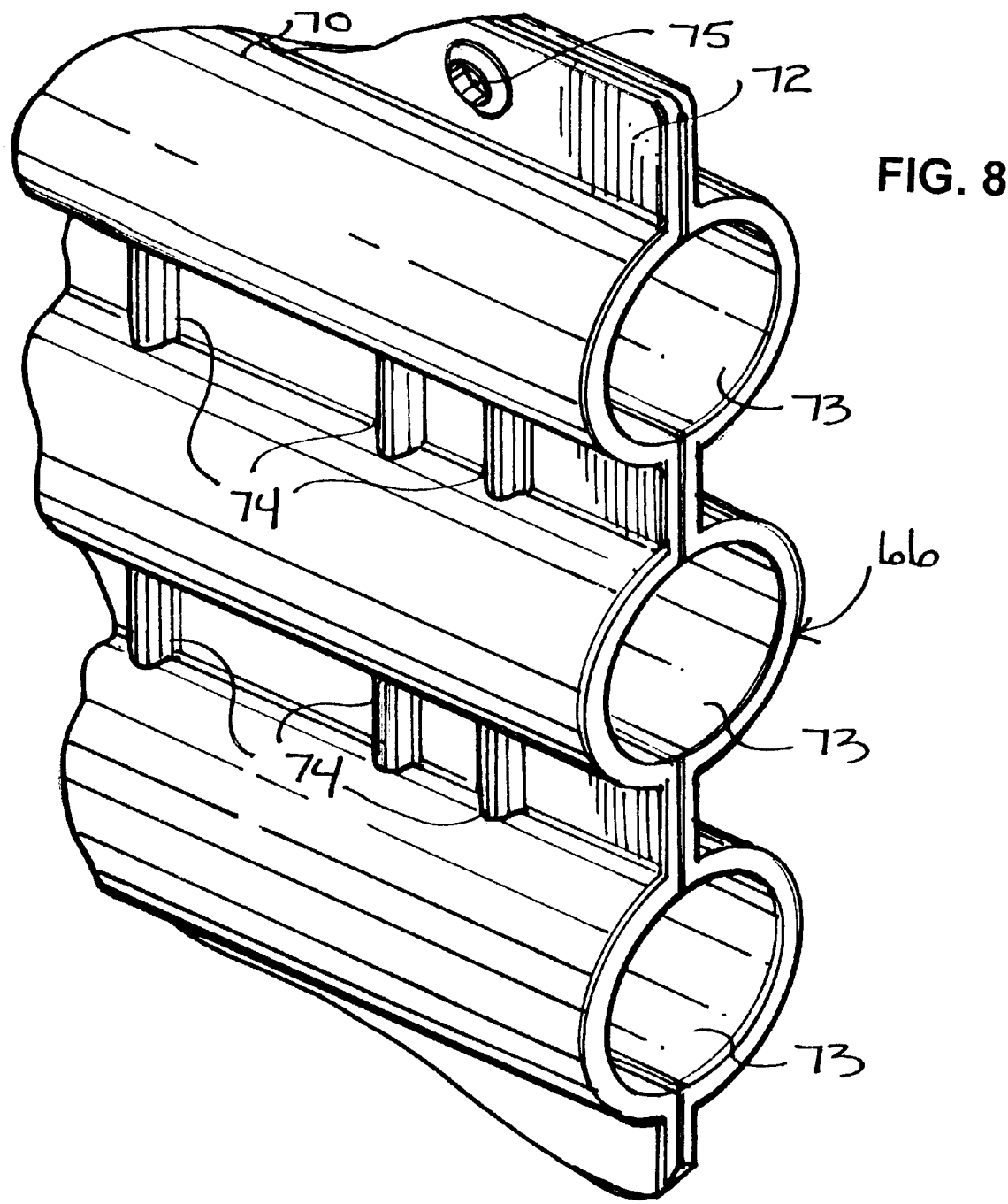
FIG. 8 illustrates an enlarged fragmented perspective view of apparatus of FIG. 7.

As shown in FIG. 7, and with additional reference to FIG. 8, barrier 66 includes a sheet-like strip or element 70 having a first extremity 71 (shown only in FIG. 7) and a second extremity 72 (shown only in FIG. 8). Preferably formed of thin, flexible plastic or other similarly flexible and substantially water-impermeable material, formed with element 70 are a plurality of containers or receptacles 73 extending substantially from first extremity 71 to second extremity 72 in spaced-apart, or otherwise discrete, and substantially parallel relation. Receptacles 73 are further coupled together in fluid communication via ducts 74 as shown in FIG. 8, are each closed and exhibit a substantially elongate shape.

Rather than being sealingly fastened with foundation 62 beneath surface 63 of ground 64 in a fashion similar to element 40 previously discussed in combination with FIGS. 3 and 4, first extremity 71 is shown in FIG. 7 as having been sealingly embedded within foundation 62 during the construction of foundation 62 thus providing an alternate method of sealing fastening first extremity 71 of element 70 with a structure.

To move element 70 from a collapsed or stored orientation contained within the chamber of housing 65 and an extended orientation to encircle structure 60 and inhibit water from entering structure 60 through, for instance, doorway openings, window openings and vents formed with the exposed sidewalls of structure 60, at least one of receptacles 73 may be coupled in fluid communication with a pressured fluid source 80 via fluid line 81. In this specific example, pressurized fluid source 80 is shown contained within structure 60 with fluid line 81 shown supported through foundation 62 via a supporting conduit or guide 82. With the fluid comprised of air, water or other selected fluid, and with lids of housing 65 open, pressurized fluid source 80 may be actuated for communicating fluid into receptacles 73 with ducts 74 (shown only in FIG. 8) operative for communicating fluid into and through receptacles 73 to cause receptacles to inflate and become somewhat rigid. As receptacles 73 inflate from a deflated orientation defining substantially the collapsed orientation of element 70 as contained within housing 65, element 70 will rise outwardly from housing 65 to encircle or otherwise bound at least the exposed sidewalls of structure 60 as substantially shown in FIG. 7. To move element 70 from the extended orientation to the collapsed orientation, the foregoing process need only be reversed to deflate receptacles 73. Furthermore, due to the substantially flexible and pliant construction of element 70, element 70 will fold neatly in housing 65 upon deflation from the extended orientation to the collapsed orientation. Furthermore, one or more of receptacles 73 may be provided with closable apertures for providing ease of deflation.

As shown in FIG. 8, second extremity 72 of element 70 may, if desired, be provided with a plurality of spaced-apart eyelets 75 (only one shown) for engagement with cordage to allow element 70 to be pulled outwardly from housing 65 for deployment in the extended orientation in a manner similar to that discussed in combination with apparatus 11. Deployment of element 70 by cordage provides an alternate method of deployment if mechanical difficulties or damage prevents deployment of element 70 by inflation.

In summary, the present invention provides exemplary apparatus and methods for inhibiting flood waters from entering and causing damage to structures such as dwelling structures as shown, business structures, etc. The various embodiments of the present invention are easy to use and construct and may be retrofitted or otherwise installed with preexisting structures or incorporated into construction of new structures, are inexpensive and easy to use.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a structure extending from beneath a surface to above the surface, apparatus for inhibiting water from entering the structure, comprising:

a substantially continuous barrier having a substantially continuous extremity sealingly coupled with the structure beneath the surface, the barrier movable between a collapsed orientation and an extended orientation overlying and encircling the structure for inhibiting water from entering the structure;

cordage coupled proximate another extremity of the barrier; and means for moving cordage between first and second orientations for moving the barrier between the collapsed and extended orientations.

2. Apparatus of claim 1, wherein the barrier includes a substantially continuous, flexible and water-impermeable sheet-like element.

3. Apparatus of claim 1, wherein the barrier includes a substantially continuous and water-impermeable accordion-pleated folded element defining a plurality of sections, each one of the sections hingedly foldable into an overlying position relative an adjoining section in the collapsed orientation and extendible in series with at least an adjoining one of the plurality of sections in the extended orientation.

4. Apparatus of claim 1, further including a housing for containing the barrier adjacent the structure in the collapsed orientation.

5. Apparatus of claim 1, wherein the means for moving comprises a motor.

6. In a structure extending from beneath a surface to above the surface, apparatus for inhibiting water from entering the structure, comprising:

a substantially continuous barrier having a substantially continuous extremity sealingly coupled with the structure beneath the surface, the barrier movable between a collapsed orientation and an extended orientation overlying and encircling the structure for inhibiting water from entering the structure;

the barrier includes a substantially continuous, flexible and water-impermeable sheet-like element having a plurality of receptacles disposed in substantially parallel series and in fluid communication; and means for moving the barrier between the collapsed orientation and the extended orientation.

7. Apparatus of claim 6, wherein the means includes a pressured fluid source coupled with at least one of the plurality of receptacles in fluid communication, the pressurized fluid source for inflating the plurality of receptacles with fluid for moving the element from the collapsed orientation to the extended orientation.

8. In a structure extending from beneath a surface to above the surface, a method of inhibiting water from entering the structure, the method comprising the steps of:

providing a barrier movable between a collapsed orientation and an extended orientation;

substantially sealingly engaging an extremity of the barrier with the structure beneath the surface;

providing cordage;

coupling cordage with the barrier; and moving the cordage between first and second orientations for moving the barrier from the collapsed orientation to the extended orientation to overly and encircle the structure for inhibiting water from entering the structure.

9. The method of claim 8, wherein the step of providing a barrier further includes the step of providing a substantially continuous, flexible and water-impermeable sheet-like element.

10. The method of claim 8, wherein the step of providing a barrier further includes the step of providing a substantially continuous and water-impermeable accordion-pleated folded element defining a plurality of sections, each one of the sections hingedly foldable into an overlying position relative an adjoining section in the collapsed orientation and extendible in series with at least an adjoining one of the plurality of sections in the extended orientation.

11. In a structure extending from beneath a surface to above the surface, a method of inhibiting water from entering the structure, the method comprising the steps of:

providing a barrier movable between a collapsed orientation and an extended orientation, the barrier including a substantially continuous, flexible and water-impermeable sheet-like element having a plurality of receptacles disposed in substantially parallel series;

substantially sealingly engaging an extremity of the barrier with the structure beneath the surface; and moving the barrier from the collapsed orientation to the extended orientation to overly and encircle the structure for inhibiting water from entering the structure.

12. The method of claim 11, wherein the step of moving the barrier from the collapsed orientation to the extended orientation further includes the step of inflating the plurality of receptacles with fluid.

\* \* \* \* \*